United States Patent Office 2,812,307
Patented Nov. 5, 1957

2,812,307
LUBRICANTS

Leon Saives, Billancourt, France, assignor to Regie Nationale des Usines Renault, Billancourt, France No Drawing. Application February 6, 1953,
Serial No. 335,581

Claims priority, application France February 13, 1952

10 Claims. (Cl. 252—48.4)

In every mechanical part, it is necessary for the lubricant to remain interposed between the metallic rubbing surfaces in order to avoid the functional defect known as seizing, which is simply the successive local welding at the contact points of the surfaces and shearing of the welds thus formed.

Seizing occurs, with a given lubricant, when the pressure, which the surfaces transmitting the force exert on one another, is too high to allow any of the substances contained in the lubricant, or issuing therefrom, to remain between them. Consequently it often happens that the maximum permissible load for a mechanical part is determined by the lubricating conditions and not by the mechanical resistance of the parts constituting the mechanism. In other words, it frequently happens that the dimensions imposed by the contact conditions are considerably higher than those based on the calculation of the resistance of the materials.

It is therefore of the greatest advantage in the pursuit of quality and economy in mechanical constructions, to have lubricants available which allow as high a critical seizing pressure as possible to be applied to the bearing surfaces. Thus a great deal of work has been done on the composition of lubricating oils with this object in view which has led to the composition of mixtures currently known as extreme pressure oil, the major part of which is a mineral oil containing various substances which are generally organic salts such as lead naphthenates or organic derivatives of one or more of the elements chlorine, sulphur, selenium and phosphorus.

In actual fact the lubricants which can now be obtained commercially generally contain both a chlorinated derivative and a sulphurated derivative. It has been found that the anti-seizing capacity of each of these two types of substances is reinforced by the fact of their simultaneous presence. Organic substances containing both chlorine and sulphur have also been advocated.

Among the chlorinated derivatives known for extreme pressure use, the following may be mentioned: phenylchloroform, which is a chlorinated hydrocarbon, stearyl chloride, which is an acid chloride, characterized by the group COCl.

Of the sulphurated products the following may be mentioned: dibenzyl sulphide, methylcetyl sulphide, laurylmercaptan and dithioheptadecyclic acid.

Then, as a substance containing both chlorine and sulphur, chlorinated alkylthiocarbonates and diparachlorobenzyl disulphide are used.

It is possible, in the laboratory, to estimate the high pressure qualities of lubricants by measurements on what is known as a 4-ball machine, in which three tangential balls, resting on a horizotnal plane, rub against a fourth ball, which rests on them. The three lower balls are held close together in such a way that they are incapable of any movement in relation to one another and are contained in an apparatus which is free to turn in a horizontal plane but the course of which is limited by a spring, the deformation of which is measured in order to calculate the value of the driving couple.

The upper ball is itself rigidly seucred to another apparatus which transmits to it a rotary movement round its vertical diameter.

This movement is carried out while a given load, directed upwards, is applied to the set of three balls. According to the load and the nature of the lubricant, there may be observed a continuous sliding of the upper ball, or an abrupt seizing after a certain period of sliding, or an immediate seizing from the moment it is set in motion.

It has been found that for a given lubricant placed in contact with the balls, no seizing takes place as long as the load remains below a certain critical value and that for loads greater than this the time-lag in seizing, that is to say the time which passes between the setting in motion and the seizing, decreases according to a characteristic law for each lubricant, when the load increases.

The best extreme pressure lubricants prepared up to date have been tested in the measuring apparatus just described and the capacity of four of them, designated by the letters A—B—C—D, to prevent seizing, is characterised below by the maximum permissible load without seizing and by the load for which the seizing time-lag is 2.5 seconds.

These results are compared with those for a pure mineral oil without any additive having special properties. The measurements were made with hard steel balls 12.7 mm. in diameter.

|  | Maximum permissible load without seizing, kilograms | Load for seizing, time-lag of 2.5 seconds, kilograms |
| --- | --- | --- |
| Pure mineral oil | 55 | 91 |
| A | 72 | 94 |
| B | 75 | 110.5 |
| C | 77 | 114 |
| D | 122 | 162 |

The applicant has discovered the means of constituting mixtures with a mineral oil base which are considerably more effective as extreme pressure lubricants than those known to date. In the new process, the known property possessed by certain organic sulphides of increasing the anti-seizing properties of other substances, is used; but the characteristic of the invention lies in the particular molecular construction of the organic halogen compounds introduced alongside the sulphides. Whereas in the previous work on special lubricating additives, the only concern was to place the halogens, in the molecule of these substances, in a position favourable for attachment to the metallic surfaces, the applicant has sought and found a molecular construction which, as a result of its particular form, has the effect of considerably increasing the concentration of active substance in the immediate vicinity of the metallic surfaces immersed in the lubricant, even before the sulphur, chloride or other metalloids have had any action.

According to the invention, therefore, the halogen compound to be incorporated in the mineral oil, together with a sulphide, should be a fatty acid with a long chain, halogenated at the end of the chain by three halogen atoms; the length of the chain, which should equal at least eight carbon atoms, should be sufficient to allow of molecular orientations.

The invention also covers all generalizations of the same principle, consisting of having recourse to other polar molecules, using, for example, the acid esters of sulphuric acid or other acids, or replacing the hydroxylated acid radical by other acid radicals such as the phenolic radical or the sulphonic radical.

The replacement of the fatty chain by other hydrocarbon constituents does not remove the polar character of the long chain and therefore remains within the scope of the invention.

As an example of a particularly effective chemical compound, tetrachlorolauric acid may be mentioned, $$Cl_3C-CH_2-CHCl(CH_2)_8-CO_2H$$

prepared in known manner by the action of undecylenic acid on carbon tetrachloride in the presence of a catalyst such as benzoyl peroxide.

A mixture of 5% of this body with 2% dibenzyl disulphide and 93% mineral oil, brought into contact with the balls in the testing machine described above, prevents all seizing even if the load is raised to 600 to 700 kgs. The comparison of these figures with those given in the table above, the parameters being the same in every case in each test, clearly show that the effectiveness of the mixture discovered by the applicant is much greater than that of the best products previously known; indeed, with the best of these, the load must remain below 122 kgs. to avoid all seizing.

The surprising result thus obtained can be given a scientific explanation. The experimental facts relating to the action of extreme pressure products can be interpreted satisfactorily, if it is admitted that the opposition to seizing results from the attachment of the organic molecules to the metallic surfaces by the sulphur or by the halogens, but that this attachment does not take place until the metal has reached a sufficiently high temperature as a result of friction. The surface density of the organic coating only increases progressively and only from the time when the sufficiently high temperature has been reached. On the other hand, in the products, the use of which forms the subject of the present invention, the affinity of the acid radical for the metals at normal low temperatures, maintains a permanent high surface density of the organic coating on contact with the metallic surfaces, even before the mechanism has been set in motion. It may be supposed, by analogy with the oily properties of fatty acids, that the affinity for the metal of the products used according to the invention, disappears when a certain temperature is reached, which is that at which the fusion of the metallic salt of the organic acid takes place; but the halogens then tend to react on the metal and attach themselves to it in large quantities as a result of the substantial concentration of active products in the vicinity of the surface.

Other products, just as effective as the tetrachlorolauric acid quoted as an example, and of a closely related chemical constitution, can be prepared very economically. For example, carbon tetrachloride may be made to react on methyl undecylenate in the presence of benzoyl peroxide, thus obtaining methyl tetrachlorolaurate with an excellent yield, in the neighbourhood of 70%. By saponification, followed by acidification, there is obtained, according to the degree of saponification, one or the other of the two ethylene acids: $Cl_3C-CH=CH(CH_2)_8-CO_2H$ and $Cl_2-C=CH-CH=CH(CH_2)_7CO_2H$, which, by the action of chlorine, give the penta- and hexachlorolauric acids respectively: $Cl_3C(CHCl)_2-(CH_2)_8CO_2H$ and $Cl_3C-(CHCl)_3(CH_2)_7CO_2H$. These compounds, mixed with the mineral oil and the dibenzyl disulphide have an anti-seizing capacity of the same order as that already indicated for the products of the invention.

Instead of saturating the ethylene acids referred to above with chlorine, they can be subjected to a controlled hydrogenation so as to obtain trichlorolauric acid, the use of which comes within the scope of the invention. This acid can be obtained in another way by the reaction, under appropriate conditions, of chloroform on undecylenic acid, either directly or by means of an ester.

It is also possible to cause hydrochloric acid gas to act on the chlorinated monoethylenic acid at the end of the chain to obtain a tetrachlorolauric acid. The economic advantage of this last series of operations lies in the very good yield of the reaction of carbon tetrachloride on the methyl undecylenate, and also in the fact that this ester is obtained industrially in a direct manner by the cracking of castor oil.

The content of sulphurated products added to the lubricant should be carefully chosen. For example, in a lubricant which contains 5% halogenated products according to the invention, the most favourable results are obtained with dibenzyl disulphide content in the neighbourhood of 2%. It is possible to make seizing appear with very heavy loads if this content is raised to 5%.

It should be noted that by mixing the halogenated products described here with a mineral oil, to the exclusion of all sulphurated products, it is possible to obtain lubricants having an extreme pressure quality in the neighbourhood of that of the best oils hitherto prepared for this purpose. It is therefore possible, when exceptional properties are not required, to prepare extreme pressure oils of good current quality, with great economic advantages.

I claim:

1. A lubricant for mechanical parts subjected to friction under heavy pressure consisting essentially of a major proportion of a mineral lubricating oil and a small amount effective to prevent seizing under heavy pressure of an organic sulfur compound and of a long chain fatty acid containing 12 carbon atoms and having the terminal carbon atom opposite the carboxyl group substituted with 3 chlorine atoms.

2. A lubricant as defined in claim 1, wherein said chlorinated fatty acid is trichlorolauric acid of the formula $Cl_3C(CH_2)_{10}CO_2H$.

3. A lubricant as defined in claim 1, wherein the chlorinated fatty acid is tetrachlorolauric acid of the formula $Cl_3C-CH_2-CHCl(CH_2)_8CO_2H$.

4. A lubricant as defined in claim 1, wherein the chlorinated fatty acid is pentachlorolauric acid of the formula $Cl_3C-(CHCl)_2-(CH_2)_8CO_2H$.

5. A lubricant as defined in claim 1, wherein the chlorinated fatty acid is hexachlorolauric acid of the formula $Cl_3C(CHCl)_3(CH_2)_7CO_2H$.

6. A lubricant as defined in claim 1, wherein the chlorinated fatty acid component consists of a mixture of fatty acids containing 12 carbon atoms and having 3 chlorine atoms attached to the terminal carbon atom opposite the carboxyl group.

7. A lubricant as defined in claim 1, wherein the organic sulfur compound is dibenzyl disulphide.

8. A lubricant for mechanical parts subjected to friction under heavy pressure consisting essentially of a major proportion of a mineral lubricating oil and minor proportions of an organic sulfur compound selected from the group consisting of dibenzyl disulphide, methylcetyl sulphide, laurylmercaptan and dithioheptadecyclic acid and of a long chain fatty acid containing 12 carbon atoms and having the terminal carbon atom opposite the carboxyl group substituted with 3 chlorine atoms, the quantity of said fatty acid being greater than the quantity of said sulfur compound.

9. A lubricant for mechanical parts subjected to friction under heavy pressure consisting essentially of 93% of a mineral lubricating oil, 2% of an organic sulfur compound selected from the group consisting of dibenzyl disulphide, methylcetyl sulphide, laurylmercaptan and dithioheptadecyclic acid and 5% of a long chain fatty acid containing 12 carbon atoms and having the terminal carbon atom opposite the carboxyl group substituted with 3 chlorine atoms.

10. A lubricant as defined in claim 9, wherein said sulfur compound is dibenzyl disulphide.

References Cited in the file of this patent

UNITED STATES PATENTS

| | | |
|---|---|---|
| 2,178,534 | Lincoln et al. | Oct. 31, 1939 |
| 2,208,162 | Prutton et al. | July 16, 1940 |